Sept. 27, 1966 R. H. LONG 3,275,962

ELECTRICAL CIRCUIT SELECTOR

Filed March 26, 1964 5 Sheets-Sheet 1

INVENTOR.
RICHARD H. LONG
BY Wells & St. John
ATTYS.

Sept. 27, 1966

R. H. LONG 3,275,962

ELECTRICAL CIRCUIT SELECTOR

Filed March 26, 1964

5 Sheets-Sheet 2

INVENTOR.
RICHARD H. LONG

BY Wells & St. John

ATTYS.

Sept. 27, 1966 R. H. LONG 3,275,962

ELECTRICAL CIRCUIT SELECTOR

Filed March 26, 1964

5 Sheets-Sheet 3

INVENTOR.
RICHARD H. LONG

BY Wells & St. John

ATTYS.

INVENTOR.
RICHARD H. LONG
BY Wells & St. John
ATTYS.

INVENTOR.
RICHARD H. LONG
BY Wells & St. John
ATTYS.

3,275,962
Patented Sept. 27, 1966

3,275,962

ELECTRICAL CIRCUIT SELECTOR

Richard H. Long, E. 1428 Park, Grants Pass, Oreg.

Filed Mar. 26, 1964, Ser. No. 354,951
3 Claims. (Cl. 335—107)

This invention relates to a novel selector for actuating a plurality of electrical circuits by a lesser number of controlling elements.

The present invention is concerned with a mechanically simple selector mechanism for activating a relatively large number of electrical circuits from a plurality of input units which overlap in their selection of final circuits to be utilized. The device requires only one set of output contacts for each circuit regardless of the number of signal inputs.

It is a first object of this invention to provide a mechanical selector device which eliminates all extraneous electrical circuits between input signals and output signals not activated at a particular time. The device fully isolates each output circuit from each input circuit so that no possibility of a short circuit or unwanted closure of a circuit can exist.

Another object of this invention is to provide such a device which can be manufactured in any multiple desired, so as to have an unlimited number of inputs or outputs as might be required in a particular instance.

Another object of this invention is to provide a compact unit requiring a minimum amount of wiring in order to effect complex switching desired.

These and further objects will be evident from a study of the following description when taken together with the accompanying drawings, which illustrate one preferred form of the device. It is to be understood that this form of the invention is merely exemplary and that it is not intended to restrict the scope of the invention defined in the claims which follow.

Figure 8:
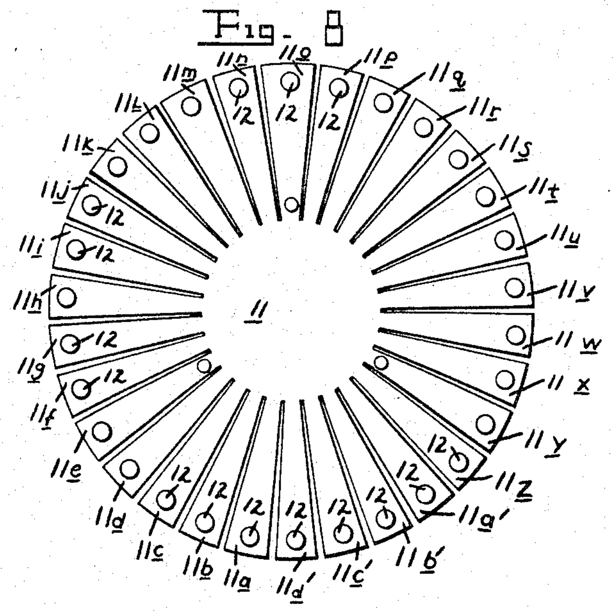
FIGURE 8 is a plan view of the common contact member.

Referring now to the drawings, the circuit selector includes a rigid supporting framework capped by a horizontal square end plate 10 at its upper end. The end plate 10 has a lower contact plate 11 mounted on its upper surface. The contact plate 11 is formed from a disc of spring material such as beryllium-copper sheet, in the manner shown in FIGURE 8. The plate 11 has thirty separate arcuate segments formed by radial slots cut through its thickness. The segments are labeled in the drawings by the numerals 11*a* through 11*d* (see FIGURE 8). Each arcuate segment is provided with a silver contact 12 on its upper face. The contacts 12 are installed near the outer periphery of the plate 11.

Figure 1:
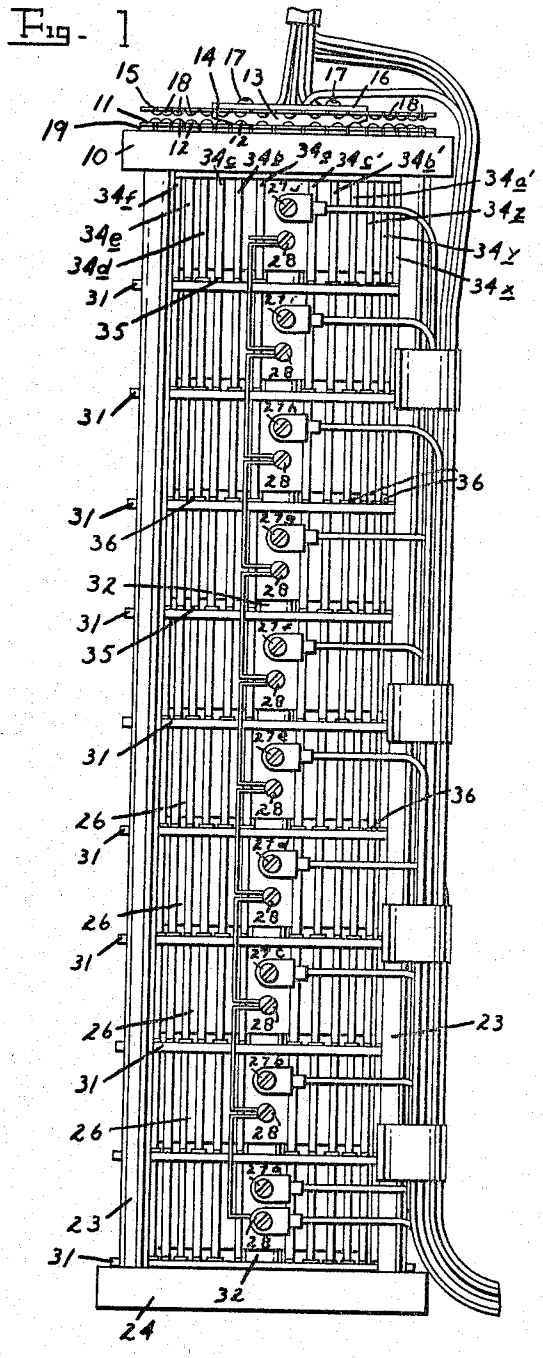
FIGURE 1 is a side view of a complete circuit selector constructed according to this invention.
Figure 2:
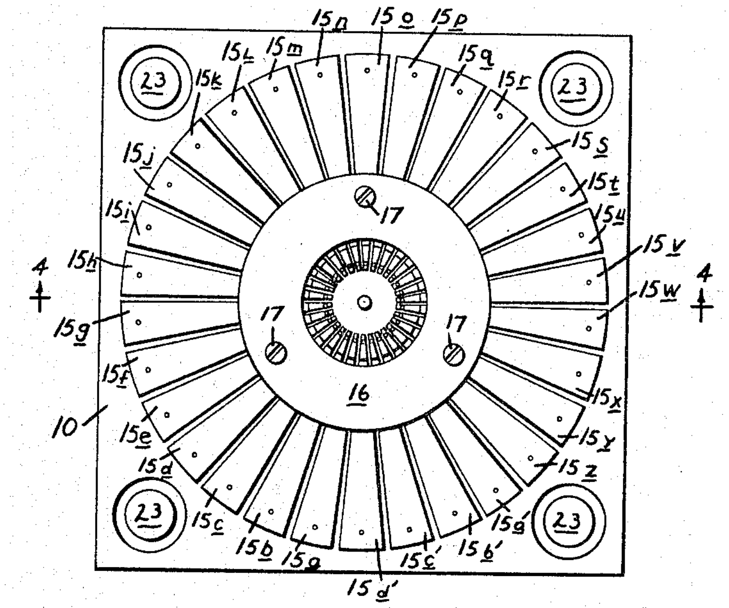
FIGURE 2 is a top view of the selector shown in FIGURE 1 with the wiring eliminated.
Figure 3:
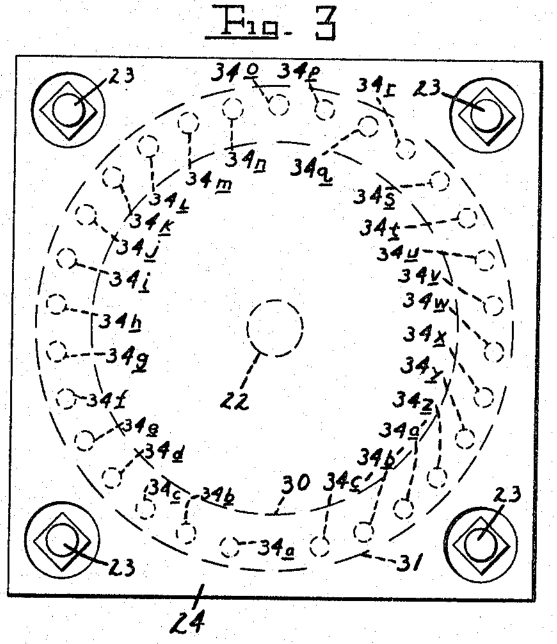
FIGURE 3 is a bottom view of the selector unit shown in FIGURE 1.

The lower contact plate 11 is separated from the radial leave 15 of an upper contact by means of a spacing block 13 made of an electrical insulating material, as is also the end plate 10. The lower surface of the spacer block 13 is relieved adjacent to its outer periphery as indicated at 14 in FIGURE 4. The relief at 14 is adapted to allow upward motion of the outer ends of the segments 11*a* through 11*d* of the lower contact plate 11. The several radial leaves 15 are designated in FIGURE 2 by the numerals 15*a* through 15*d'*, and are in vertical alignment with the corresponding segments 11*a* through 11'*d*. Each of the leaves 15 is provided with a silver contact 18 on its lower surface, adapted to make contact with the previously described contacts 12 directly below them. This contact assembly is completed by an upper insulating clamp ring 16 and screws 17 that hold the various components tightly together.

It is to be understood that the lower plate 11 may be made in as many segments as necessary where it is not desired that the line side be common to all output circuits. The top leaves 15 are electrically separated and comprise the load side of the switching device. Also, by the provision of a third set of contacts directly above those described, the switching device may be made "double throw" if this is desired.

The lower surface of the conductor plate 11 is insulated by a disc 19 of insulating material cut in precisely the same manner as the plate 11. Thus, the disc 19 has aligned arcuate segments that can move in unison with the previously described segments 11*a* through 11*d'*.

Figure 4:
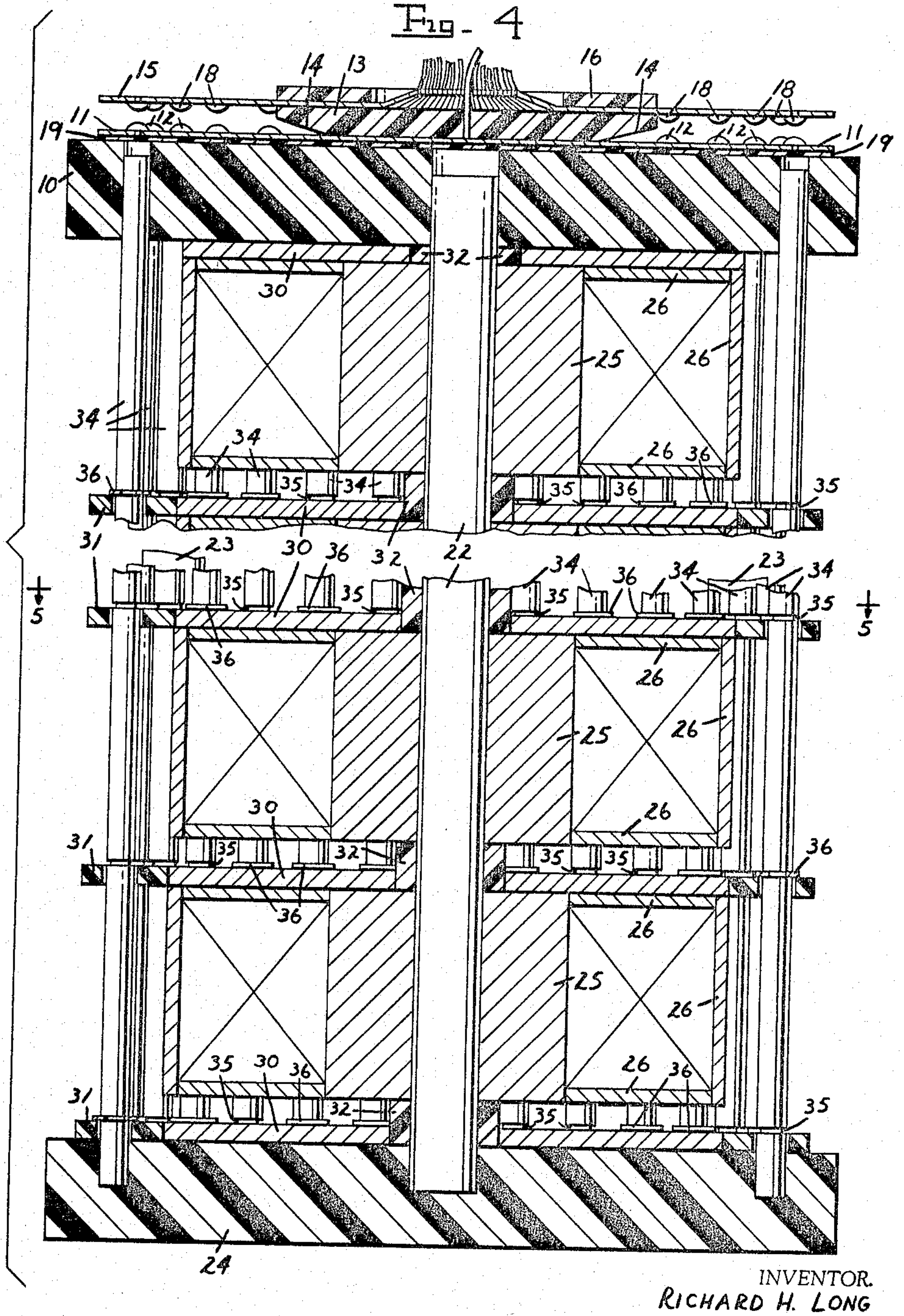
FIGURE 4 is a vertical sectional view taken along line 4—4 in FIGURE 2, the wiring connections being generally shown, and the central portion of the selector being broken away.

Thus, the contacts forming the output of the selector comprise thirty pairs of closable contacts spring biased by the materials of the discs to the open condition shown in FIGURE 4. For reasons that will be evident below, only twenty-nine of the contact pairs are usable in the device, so that twenty-nine output circuits or load devices can be controlled by the selector.

In the example illustrated, there are shown ten separate inputs to the selector, designed to selectively actuate various combinations of the twenty-nine output connections. It is to be understood that any number of inputs or outputs can be utilized. The number of output segments could be increased by decreasing the included angle between the slots or by arranging additional rows of contacts with separate annular discs concentric with one another on the plate 10. The number of inputs can be increased by simply stacking additional units in the manner described below.

The various output contacts are controlled by a series of electromagnetic units stacked one above the other within the supporting framework. Besides the upper end flight 10, this framework includes a central support rod 22 of non-magnetic material and four outside tie rods 23 that rigidly bind together the plate 10 and a similar base plate 24. Thus the framework in this example is a rectangular structure with a central support rod 22 extending along the central longitudinal axis of the framework. Rod 22 is preferably non-magnetic. Mounted on the rod 22 are ten wound iron cores 25. Each iron core 25 is concentrically embedded in a cylindrical iron ring 26 having the same thickness as the core 25 to form part of an "ironclad" magnetic circuit. The electrical leads to the wound iron cores 25 are mounted on posts directly under one of the pairs of contacts 11*d'* and 15*d'* previously described, the common coil terminal being designated by the numeral 28 and the individual input connections being designated by the numerals 27*a* through 27*j*.

Figure 5:
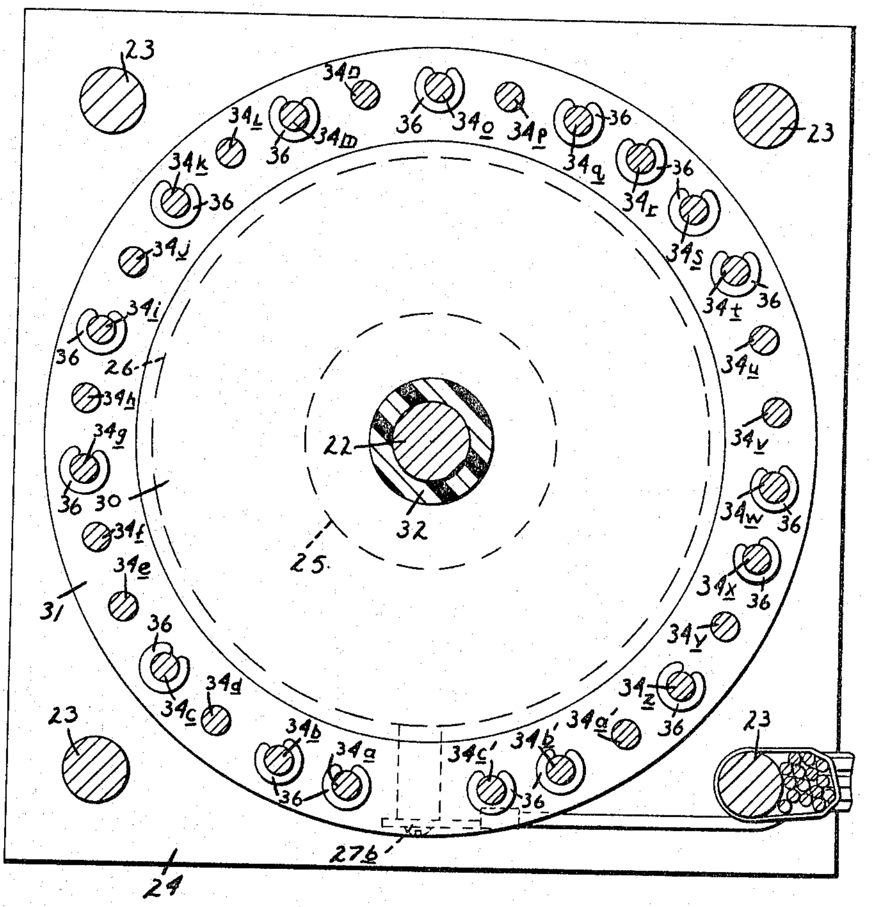
FIGURE 5 is a sectional view taken along line 5—5 in FIGURE 4.
Figure 6:
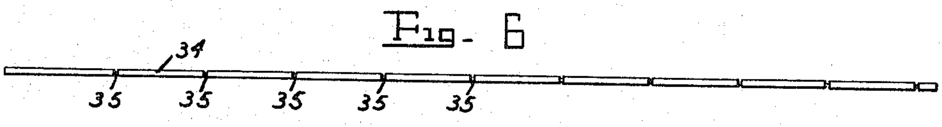
FIGURE 6 is a view of a single rod.
Figure 7:
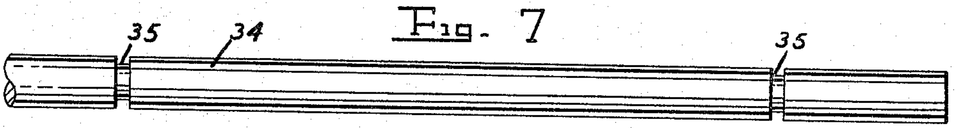
FIGURE 7 is an enlarged view of one end of a single actuating rod.

The iron cores 25 are spaced from one another along the length of the central support rod 22 by enlarged spacer collars 32. The collars 32 are made of non-magnetic material and slidably mount iron armature discs 30 that have peripheral plastic or insulating rings 31 secured to them. The purpose of the annular ring 31 is to minimize the weight of the individual discs 30 and to reduce their initial cost. The disc 30 has the same diameter as the rings 26, and the ring 31 extends beyond this diameter as is evident from FIGURE 4. This armature assembly can also be seen quite clearly in FIGURE 5 of the drawings.

A number of longitudinal cylindrical rods 34 of a non-magnetic material are slidably received through aligned apertures in the armature disc ring 31 and in the end plate 10 and base 24. The rods 34 are held in place by the lower base 24 on which they normally rest in the manner shown in FIGURE 4. Each rod 34 is aligned with a pair of the output contacts previously described. The individual rods are designated in the drawings as 34*a* through 34*c′*, their being no rod aligned below the segment 11*d′* and leaf 15*d′*. This is due to the space taken by the coil terminals 27 and 28.

Each rod 34 has formed thereon a series of annular grooves 35 that are located directly adjacent to the upper surface of the rings 31 through which the rods 34 are received. The rods 34 are adapted to be selectively lifted by particular discs 30. This is achieved by placement of spring retaining rings 36 in the grooves 35 of the rods 34 adjacent to the particular rings 31 which are to lift them.

The armature assembly is completed by a top disc 30 which forms the top portion of the magnetic circuit for the uppermost wound iron core 25. As can be seen in the drawings, each subsequent disc 30 normally rests on the wound iron core 25 directly below it, so that only one air gap exists in each magnetic circuit, namely at a location directly below it. Thus, when power is applied to any particular pair of terminals 27 and 28, the respective core 25 will lift the disc 30 directly below it. The amount of travel of the disc 30 is limited by the height of the spacer 32 that separates the two adjacent cores 25. This gap is sufficient to allow any rod 34 that is lifted by a disc 30 and ring 31 to close the contacts engaged by the rod 34. The pitch circles of the various apertures which receive the rods 34 are identical and the apertures for each rod 34 are in longitudinal alignment, so that the rods 34 can freely slide within the supporting framework and idle rings 31 without binding.

To select the circuit combination that any particular core 25 is desired to operate, a retaining ring 36 is fixed to the rod 34 by means of a groove 35 at the level of the ring 31 associate with that electro-magnetic unit. Thus, when the individual core 25 is energized, the upward movement of the associated ring 31 will cause all of the rods 34 containing retaining rings 36 at that level to close the contacts 12, 18 directly above the actuated rods 34.

It is to be noted that no electrical connections exist between the cores 25, rods 34, and the contacts 12, 18, so that no possibility of extraneous circuits or short circuits exists. Thus, a number of rings 31 can be utilized to operate a single set of contacts 12 and 18 in combination with other contacts 12 and 18 without causing unwanted circuits to be completed through the contacts themselves. All unwanted output circuits will remain open, since the rods that actuate these circuits will not be lifted by the particular activated ring 31.

Figure 9:
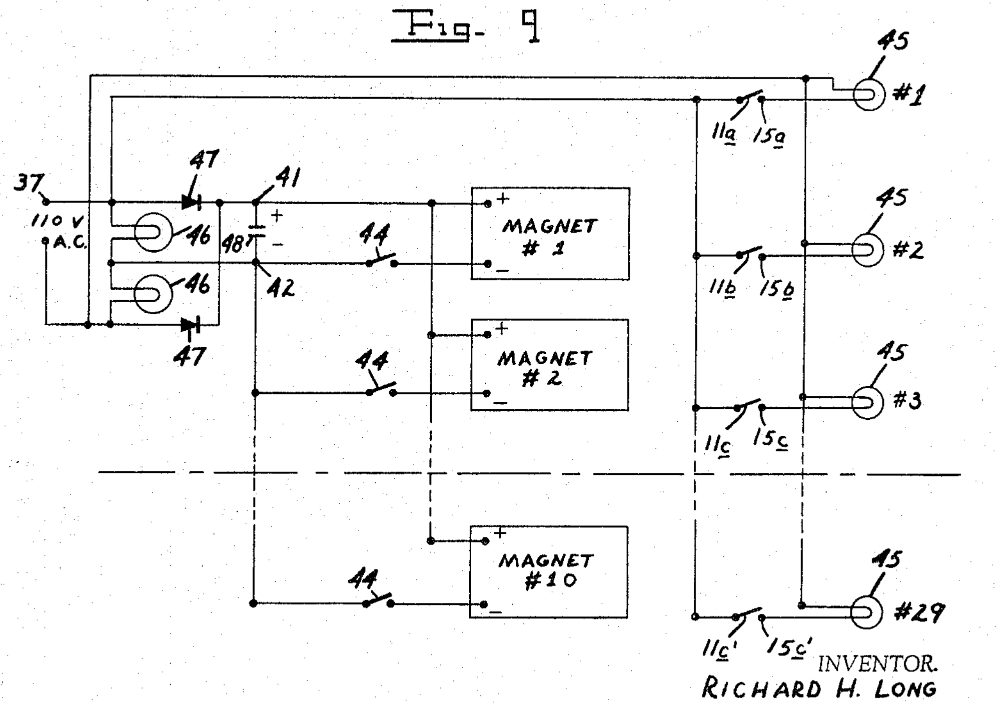
FIGURE 9 is a somewhat diagrammatic wiring diagram of the electrical circuits involved.

A wiring diagram that is typical in the use of this device is shown in FIGURE 9. A conventional source of 110 volt alternating current power is designated at 37. Two 25 watt lamps 46 are shown connected in series across the source 37. Two silicon rectifier diodes 47 are connected as shown to provide full wave rectification of the 55 volt divided source. A 500 mfd. capacitator 48 charges up to the approximate 75 volt peak voltage to supply the extra energy required to close the air gap when a particular wound iron core 25 is activated. The voltage at the D.C. outputs 41 and 42 after closing of the air gap will drop to a value of 8 or 9 volts, which has been found to be adequate to hold an armature ring 26 in its closed position. The combination of the 25 watt lamps 46 and 75 ohm input impedance to the operating wound iron cores 25 has been proven satisfactory in actual operation. One feature of this power supply is that a short circuit on the D.C. side does not injure the diodes 47, as the short circuit can be held within their capacity by lamps 46.

The D.C. output connection 41 is a common connection to each of the wound iron cores 25. The individual cores 25 are wired to the remaining D.C. connection 42 by means of switches 44 that can be manually operable or controlled by relays in the usual fashion.

The output circuits previously described can be used to operate a particular load. As shown, the circuits are used for lamp circuits to light lamps 45 which may be individual lamps or groups of lamps. The lamps are connected to the A.C. source 37 through the contacts 12, 18, as previously described.

Many modifications of this selector device will be evident to one skilled in the field. Its applications are numerous. One simple application would be the control of a lamp bank having a plurality of lamps mounted on the bank for lighting various patterns such as those necessary to display selected numerals. The number of inputs might correspond to the number of numerals desired, and the number of outputs would correspond to the number of lamp circuits necessary to make up the various combinations. The device is not to be limited to such an application, however, since there are many other applications for such a mechanically actuated selector device. For these reasons, only the following claims are intended to restrict and accurately define the scope of this invention.

Having thus described my invention, I claim:

1. An electrical circuit selector, comprising:
a rigid framework including a fixed end member;
a plurality of movable electrical contacts mounted on said end member;
a plurality of actuating rods, said rods being independently mounted on said framework for longitudinal axial motion relative thereto in parallel directions, each rod being in longitudinal axial alignment with one of said electrical contacts;
a plurality of electro-magnetic units stacked on said framework in axially spaced positions along the length of said rods, each electromagnetic unit including a wound core fixed to said framework and a movable metal plate adjacent thereto, each metal plate being apertured to slidably receive said rods;
and removable protruding elements on a pre-selected combination of said rods adjacent to each of said plates.

2. An electrical circuit selector comprising:
a rigid framework including a fixed end plate;
a plurality of spring biased electrical contacts mounted on said end plate, said contacts being in the form of arcuate segments;
a plurality of wound electro-magnetic cores stacked on said framework in fixed locations spaced from one another;
a plurality of plates movably mounted on said framework for motion relative thereto, said movable plates being located respectively adjacent to said cores;
a plurality of rods, said rods being independently mounted on said framework for longitudinal axial motion relative thereto in parallel directions, each rod being in longitudinal axial alignment with one of said electrical contacts;
said plates being apertured to slidably receive said rods;
said removable protruding elements on a pre-selected combination of said rods adjacent to each of said plates.

3. A selector mechanism, comprising:
a rigid framework including a fixed end plate having a plane surface;

a plurality of movable elements mounted on said framework positioned about the plane surface of said end plate;

a plurality of actuating rods, said rods being independently mounted on said framework for longitudinal axial movement relative thereto in parallel directions perpendicular to the plane surface of said end plate, each of said rods being in longitudinal axial alignment with one of said movable elements;

and means on said framework engageable with a preselected combination of said rods to shift the rods longitudinally relative to said framework;

said last-named means comprising:

a plurality of electro-magnetic units mounted on said framework in longitudinally spaced positions along the length of said rods;

each electro-magnetic unit including a movable plate apertured to slidably receive said rods, and a magnetic core fixed to said framework adjacent to the plate;

and removable protruding elements mounted on a preselected combination of said rods adjacent to each of said plates.

References Cited by the Examiner

UNITED STATES PATENTS

| | | | |
|---|---|---|---|
| 1,896,550 | 2/1933 | Manz. | |
| 2,279,395 | 4/1942 | Gardiner | 200—104 |
| 2,689,894 | 9/1951 | Wikstrom et al. | 200—104 |
| 2,863,018 | 12/1958 | Rommel | 200—98 |
| 3,043,593 | 7/1962 | Koci | 200—98 X |

BERNARD A. GILHEANY, *Primary Examiner.*

T. D. MACBLAIN, *Assistant Examiner.*